United States Patent
Dibachi et al.

(10) Patent No.: US 8,884,463 B2
(45) Date of Patent: *Nov. 11, 2014

(54) SOLAR POWERED SYSTEM WITH GRID BACKUP

(75) Inventors: Rhonda Dibachi, Albuquerque, NM (US); Farzad Dibachi, Albuquerque, NM (US)

(73) Assignee: Noribachi Corporation, Hawthorne, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/328,871

(22) Filed: Dec. 16, 2011

(65) Prior Publication Data

US 2012/0086386 A1    Apr. 12, 2012

Related U.S. Application Data

(63) Continuation of application No. 12/564,623, filed on Sep. 22, 2009, now Pat. No. 8,138,630.

(51) Int. Cl.
*H02J 7/00* (2006.01)

(52) U.S. Cl.
USPC .......................................................... 307/65

(58) Field of Classification Search
USPC .......................................................... 307/65
See application file for complete search history.

(56) References Cited

U.S. PATENT DOCUMENTS

| | | | |
|---|---|---|---|
| 5,233,227 A * | 8/1993 | Kajimoto et al. | ............. 307/9.1 |
| 6,060,939 A | 5/2000 | Woeste et al. | |
| 6,628,009 B1 | 9/2003 | Chapel | |
| 6,768,225 B2 | 7/2004 | Chang et al. | |
| 7,339,353 B1 | 3/2008 | Masias et al. | |
| 7,443,050 B2 | 10/2008 | Ito et al. | |
| 8,138,630 B2 * | 3/2012 | Dibachi et al. | ............. 307/65 |
| 2007/0222295 A1 | 9/2007 | Wareham | |
| 2008/0077368 A1 | 3/2008 | Nasle | |
| 2009/0153096 A1 | 6/2009 | Lin et al. | |
| 2011/0049980 A1 | 3/2011 | Paik et al. | |
| 2011/0068624 A1 | 3/2011 | Debachi et al. | |
| 2011/0156479 A1 * | 6/2011 | Carroll | ............. 307/18 |

OTHER PUBLICATIONS

"U.S. Appl. No. 12/564,623, Non Final Office Action mailed Jul. 13, 2011", 7 pgs.
"U.S. Appl. No. 12/564,623, Notice of Allowance mailed Nov. 16, 2011", 5 pgs.
"U.S. Appl. No. 12/564,623, Response Filed Aug. 22, 2011 to Non-Final Office Action Received Jul. 13, 2011", 7 pgs.
Jaybalan, R., et al., "Naval Shipboard Power System", 2005 IEEE Conference Vehicle Power and Propulsion, (Sep. 2005), 5 pgs.

* cited by examiner

*Primary Examiner* — Robert L. Deberadinis
(74) *Attorney, Agent, or Firm* — Schwegman Lundberg & Woessner, P.A.

(57) ABSTRACT

A system includes a solar power subsystem that receives power from one or more solar power arrays. A storage control subsystem is coupled to the solar power subsystem to charge a battery from the power received by the solar power subsystem. A grid power control subsystem having an AC to DC converter receives power from a power grid and provides DC voltage to the storage control subsystem. A balance of system control system controls the amount of power received from the power grid as a function of a load, battery charge and received power by the solar power subsystem. The solar array and battery may be sized to provide sufficient power under normal operating conditions, with power being drawn from the grid during abnormal operation conditions.

19 Claims, 7 Drawing Sheets

SOLAR POWERED SYSTEM WITH GRID BACKUP

RELATED APPLICATIONS

This application is a Continuation of U.S. application Ser. No. 12/564,623, filed on Sep. 22, 2009, now issued as U.S. Pat. No. 8,138,630, which is incorporated herein by reference in its entirety.

BACKGROUND

Solar cells can eliminate the need for grid-tied electrical power. The amount of expensive solar material may be over-designed to handle all boundary conditions, such as fifteen straight days of heavy overcast weather, to ensure reliability. The additional solar material needed to handle the boundary conditions may be too expensive and lead to a decision not to use a solar powered solution.

In some solar cell based solutions, the solar cells are coupled to the grid to feed power back into the grid when more power is produced than needed. Complex and expensive switching circuitry may be needed to disconnect the solar cells from the grid when excess power is not being produced.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A solar-electric hybrid system includes a solar powered system with a backup grid connection. The hybrid system may result in much reduced upfront cost compared to either grid only (conventional) solutions or solar only solutions. Operating costs may be minimized compared to grid only solutions. Upfront costs may be minimal compared to a solar-only system, as additional costly solar material is not needed to cover occasional adverse solar power conditions. The use of a grid-connected backup facilitates use of enough solar material to provide power during normal operating conditions without using additional solar material to provide sufficient power during abnormal solar power conditions. Operating costs may be reduced because of the decreased pull from the grid due to solar power generated by the system and decreased need for battery maintenance, as the batteries may not be relied on as much as in prior systems. The power may be taken from the grid in case of exceptional conditions in some embodiments.

Figure 1:
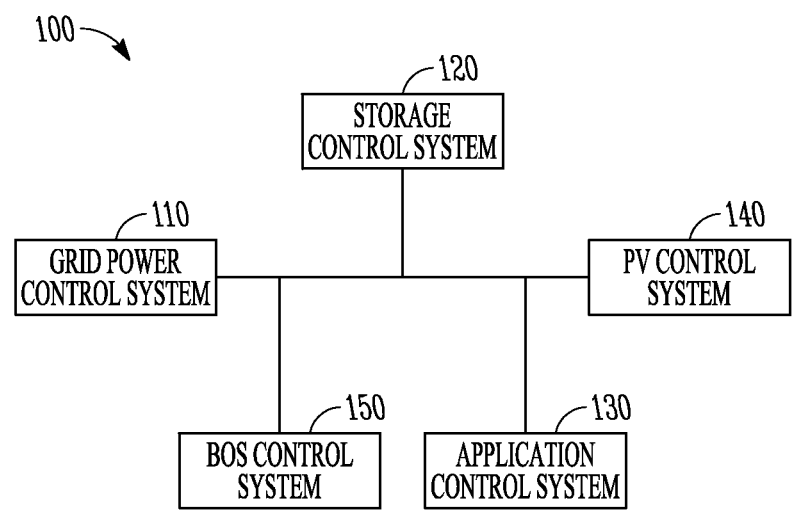
FIG. 1 is a block diagram of a control system for solar powered devices according to an example embodiment.

An advanced electronic control system may be referred to as a self powered device interface (SPDI) as shown generally at 100 in FIG. 1. The system 100 may be used to control solar power collection, battery charging and discharging, an application receiving power, and a grid connection. In one embodiment, system 100 consists of multiple systems that may be referred to as subsystems, that control various aspects of power management. In further embodiments, different subsystems may be consolidated into one or more systems, or may be broken into further subsystems. The subsystems may be implemented in hardware or combinations of hardware running software programs in various embodiments.

Control system 100 may include a grid power control subsystem (GPCS) 110 that manages access to power from an electrical grid. AC power comes in through the interface of the system and is converted to DC and used as needed. Only one connection to the grid is included in one embodiment. In further embodiments, multiple grid connections may be used if desired.

A storage control subsystem (SCS) 120 controls the electricity that comes from the GPCS 110 and stores it in one or more battery banks until called for by an application control system 130 that controls power provided to one or more load devices.

A photo voltaic control subsystem (PVCS) 140 manages electricity coming from a solar array. The electricity from the solar array is routed to the SCS 120. More than one array may be used in various embodiments. The PVCS 140 manages the electricity from all of arrays.

An application control subsystem (ACS) 130 may control power provided to anything that uses power, such as a street light, a electrical consumer appliance like a radio or a commercial device like a Wi-Fi repeater. Multiple applications may be connected to the system, and the ACS 130 controls the power to each, and manages a priority for each application.

A balance of system (BOS) control subsystem (BCS) 150 acts as the system brain and interpreter between the other subsystems. It also provides the user interface for system programming and system performance information.

Figure 2:
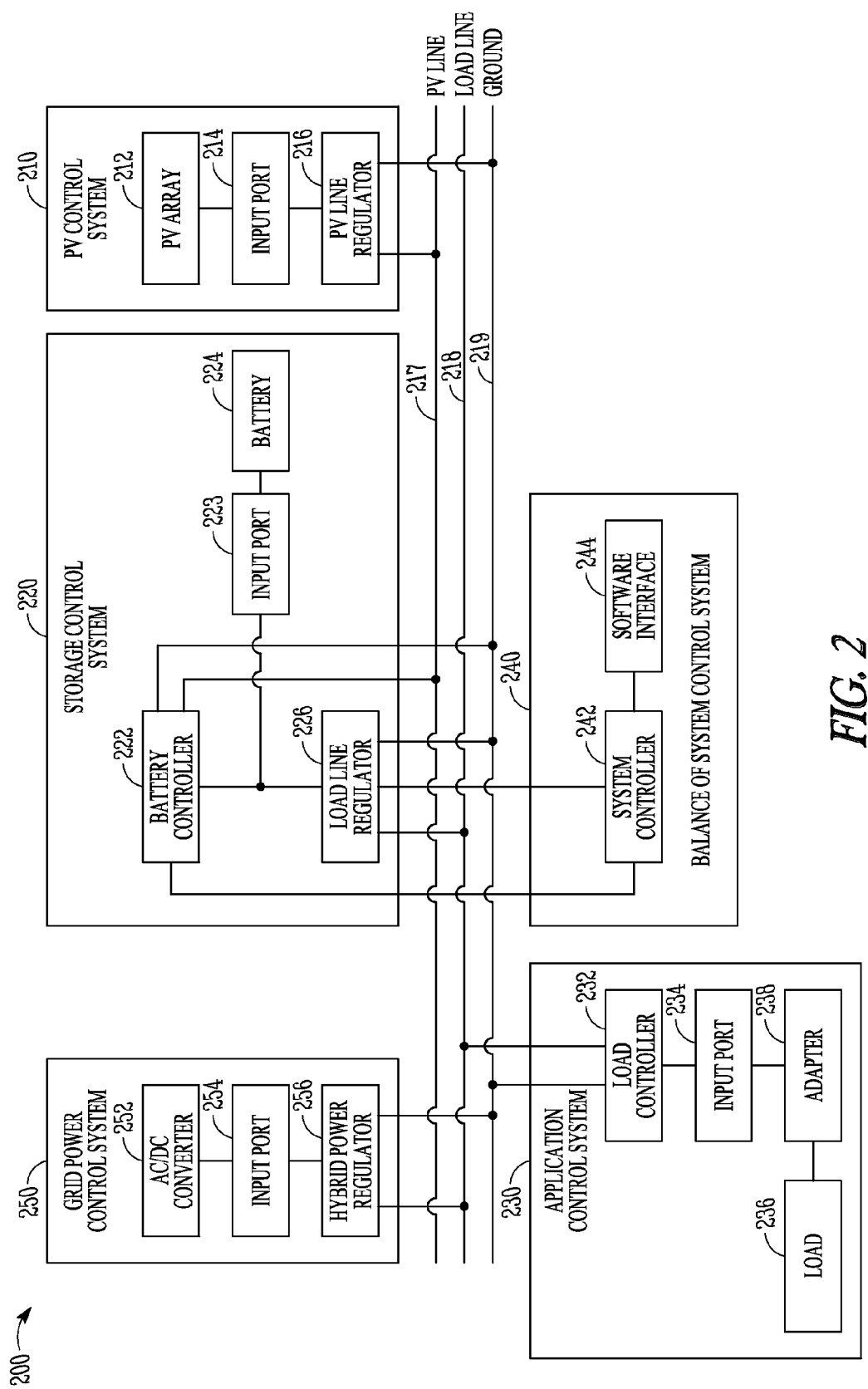
FIG. 2 is a detailed block diagram illustrating components of the control system of FIG. 1.

Further detail of a self powered device interface is shown generally at 200 in FIG. 2. Self powered device interface 200 in one embodiment is a universally extensible access point for intelligently interfacing between the PV power generation, power pull from the grid, power storage and distribution to an application. It controls the different system components: PV cells, batteries and charge controllers, and provides standard interfaces to interact with the system and provide system performance information.

A photo voltaic control subsystem 210 collects and conditions power from a photovoltaic source, such as a photovoltaic array 212 via an input port 214. Input port 214 is coupled to a photo voltaic line regulator 216, that makes power from the array 212 available to the system 200 via power distribution lines including a photovoltaic line 217, load line 218 and ground 219. In one embodiment, ground line 219 acts to ground all subsystems.

A storage control subsystem 220 conditions collected power at 222 via an input port 223 for storage into a battery bank 224. A load line regulator 226 receives control signals from the system controller 242 to control operation of the storage control subsystem 220.

An application control subsystem 230 acts as a mechanical and electrical interface point between applications and stored power and provides load management capabilities via a load controller 232. In one embodiment, the load controller 232 is coupled to an input port 234, which may be coupled to one or more loads 236 via one or more adapters 238. Adapters may be application specific, providing the power profile required by the application (12 VDC vs. 6 VDC, for example).

Figure 7:
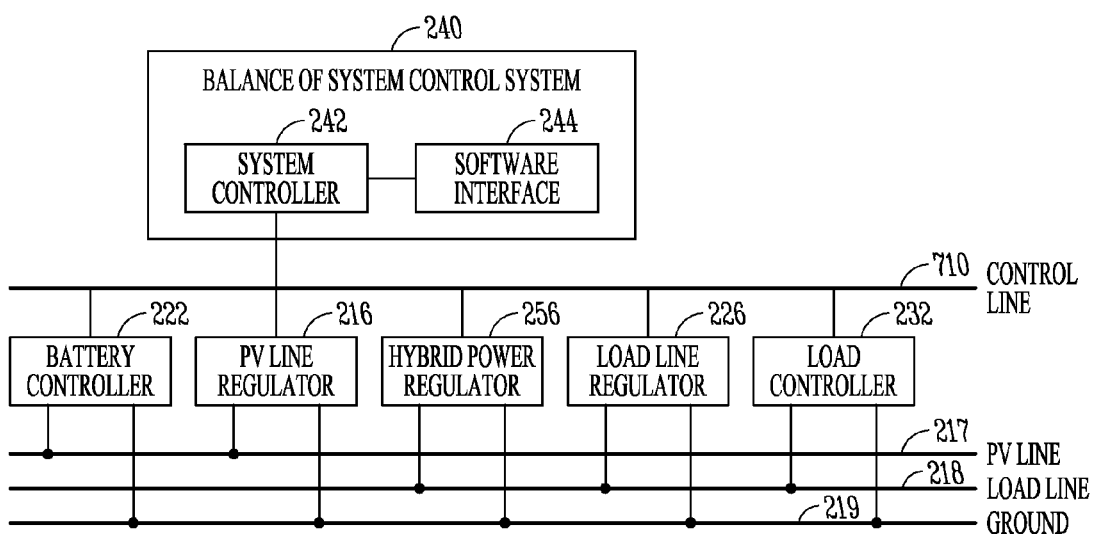
FIG. 7 is a block diagram of a balance of system control system according to an example embodiment.

A balance of system control subsystem 240 controls the source of power (either batteries from the SCS or grid from the GCS), sends and receives control data to run the numerous safety and intelligence aspects of the system including fault protection, Device Priority Protocol (DPP), and others. These functions are performed via a system controller 242, which is coupled to a software interface 244. Software interface 244 may provide the above functions in software form, and in addition may provide user interfaces for changing the manner in which power may be balanced in the system 200. Balance of system control subsystem 240 may be coupled to the other subsystems via a control bus as illustrated in FIG. 7, but is not shown so connected here to reduce the complexity of FIG. 2.

A grid power control subsystem 250 includes an AC to DC converter 252 that may be coupled directly to the grid to receive AC power and convert it to DC power. Converter 252 may be coupled to an input port 254, which is in turn coupled to a hybrid power regulator 256. Hybrid power regulator 256 in one embodiment, is coupled to both the grid via input port 254, and to the power distribution lines 217, 218, and 219. When sufficient power is received via photovoltaic line 217 to charge battery 224 or feed directly to the ACS, no grid power need be drawn. At other times, when the load from ACS is drawing more current than can be provided by the battery or PVCS, or when control algorithms indicate that the battery will be drained of power before the photovoltaic array 212 may provide sufficient power again, power may be drawn from the grid to service the load 236.

In one embodiment, the system 200 runs at 24V DC. With the exception of the AC/DC converter 252, all components and connections may be DC power.

Figure 3:
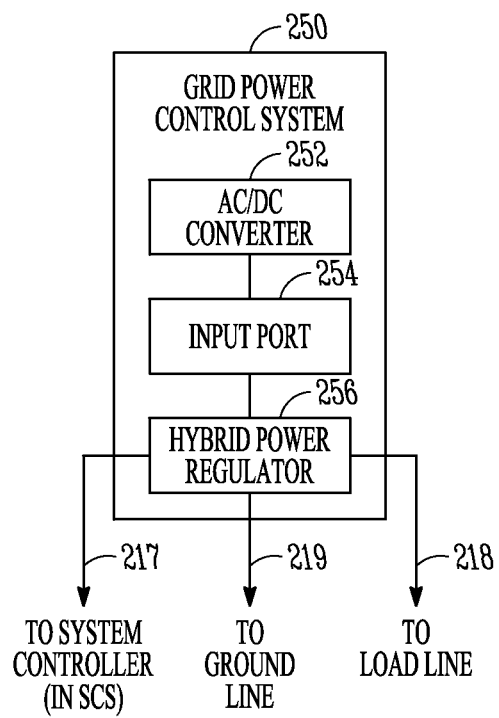
FIG. 3 is a block diagram of a grid power control system according to an example embodiment.

FIG. 3 provides further detail of the grid power control system 250, and it contains reference numbers consistent with FIG. 2. Grid power control system 250 controls the power if and when it needs to be tapped from the electrical grid. Power comes in as AC and gets converted to DC. It is provided to the system when the balance of system control subsystem 240 requests it.

At the connection to the grid, a UL certified transformer 252 may be used to convert the grid power to 24 VDC. From that point on, system 200 may be run at 24 VDC. All the components and connection are DC power in one embodiment. Only one connection to the grid is supported in one embodiment, and there is no connection feeding power back into the grid.

Figure 4:
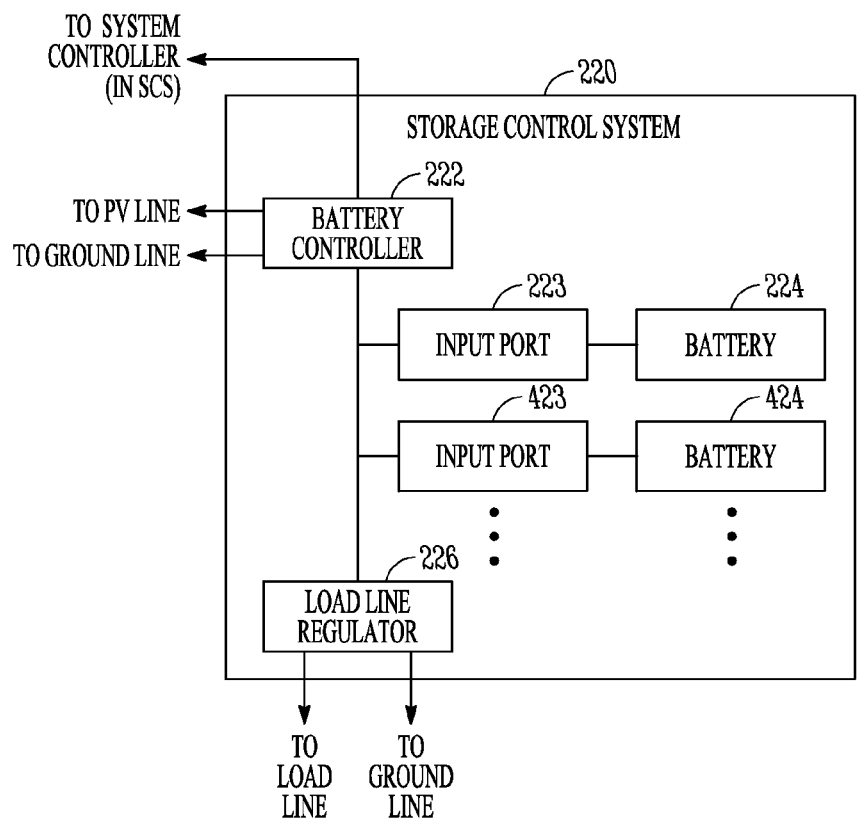
FIG. 4 is a block diagram of a storage control system according to an example embodiment.

FIG. 4 provides further detail of the storage control subsystem 220. Storage control system 220 in one embodiment conditions and stores electrical energy provided by the photovoltaic control system 210 for later use. In one embodiment, a physical manifestation of storage control system 220 may accommodate multiple battery banks as illustrated at 224 and 424 with different numbers of batteries and/or different battery chemistries. The battery banks are each coupled via respective input ports 223 and 423. While two are illustrated, many more may be provided in further embodiments. The stored electrical energy may be delivered to the application control subsystem 230 via the load line regulator 226.

The storage control subsystem 220 in one embodiment supports multiple battery ports for modularity and expansibility of storage capacity. Multiple battery chemistries can be used. So long as differing battery chemistries are attached to different input ports, the system 220 will be able to optimize charging to batteries on a case by case basis. The storage control subsystem 220 may optimize the charge profiles of the battery banks for each individual battery and chemistry. This can be optimized for maximum charge speed, maximum battery life or a balance between the two extremes. The storage control subsystem 220 may also monitor the battery temperature to allow for maximum battery charging rates while maintaining safety and battery health. The storage control subsystem 220 also can include a battery heater for cold weather conditions. The storage control subsystem 220 can handle multiple battery input voltages.

Figure 5:
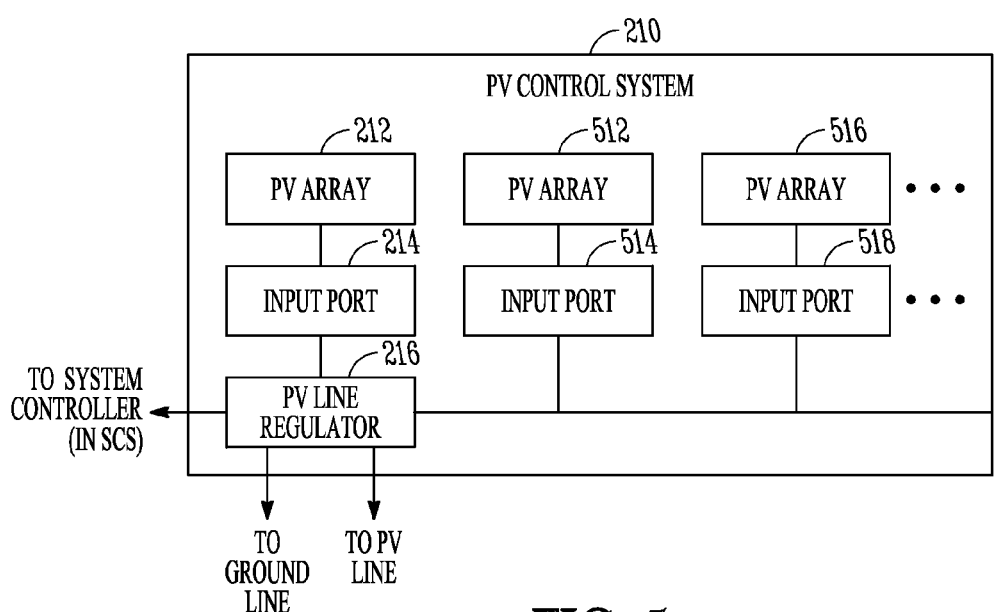
FIG. 5 is a block diagram of a photo voltaic control system according to an example embodiment.

The photovoltaic control subsystem 210, shown in further detail in FIG. 5, enables the system 200 to flexibly connect with multiple photovoltaic arrays 212, 512, 516 of varying electrical output characteristics via corresponding input ports 214, 514, and 518. Photovoltaic control system 210 actively controls and optimizes the photovoltaic array power output specific to the individual arrays over varying environmental conditions. In addition, it converts the varying electrical power inputs to a manageable system voltage via regulator 216.

Multiple photovoltaic arrays 212, 512, 516 and more, can be integrated into the subsystem, each with their own input port 214, 514, 518 with standardized mechanical and electrical interfaces through which solar arrays are attached. The photovoltaic control subsystem 210 may be used to ensure that the maximum power is generated by each solar array and that no one array shadows or degrades the system. MPPT (Maximum Power Point Tracking) may be used to manage different insulation values, environmental conditions and solar panel technology. This subsystem may also manage sun tracking for increased system efficiency. This reduces the losses and costs associated with conditioning the photovoltaic inputs to the system.

In further embodiments, the photovoltaic control subsystem may be referred to as a solar power subsystem, as any means of obtaining power from the sun may be utilized in addition to photovoltaic means. Some further examples of arrays include arrays of minors to heat a boiler to produce power, thermocouple type solar arrays, as well as other devices that can produce power from sunlight.

Figure 6:
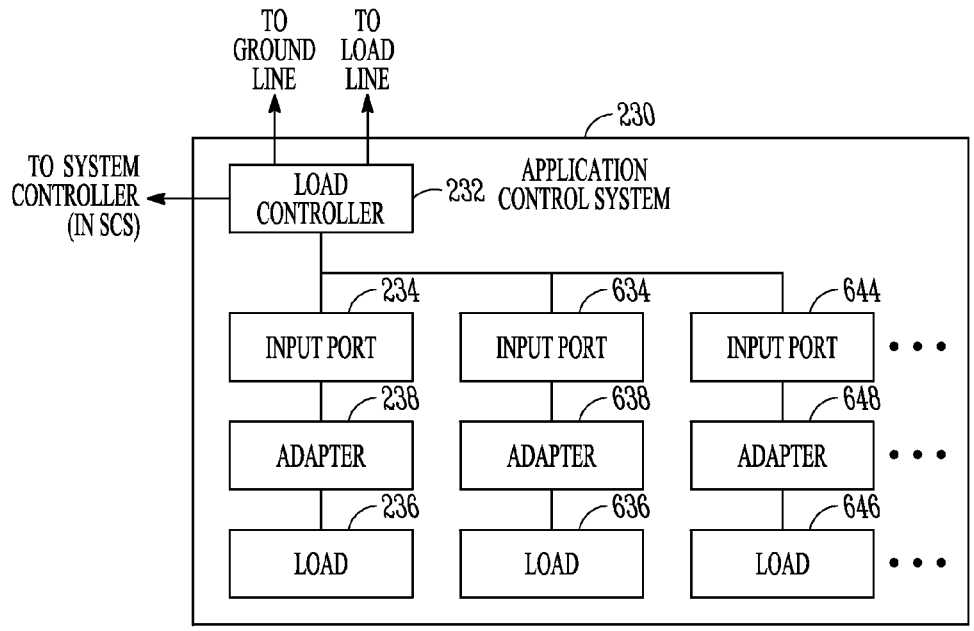
FIG. 6 is a block diagram of an application control system according to an example embodiment.

Application control subsystem 230 is shown in further detail in FIG. 6. Application control subsystem 230 provides the interface to drive multiple applications or loads 236, 636, 648. Each application or load is coupled to the load controller 232 via respective input ports 234, 634, 644 and adapters 238, 638, 648. A Device Priority Protocol (DPP) technology prioritizes the applications for power management purposes. DPP is a method of defining the relative priorities of multiple applications, and a set of rules to provide power to those applications. If the system power needs to be rationed, the relative priorities and rules may result in lower priority applications being turned off, or supplied a reduced power. Application control subsystem 230 detects and switches applications on or off or modifies their power or performance using an Intelligent Load Application Interface (ILAI) in conjunction with the DPP. In various embodiments, an adapter may or may not be used, but will be provided if the electrical (Voltage/Current) requirements for an application/load are different than that provided by the platform application port.

The application control subsystem 230 uses Device Priority Protocol in one embodiment to prioritize applications for power management purposes. The Intelligent Load Application Interface Technology allows the subsystem to provide variable power levels (on, off, or a state in between) to applications based on DPP. It also allows application disconnect when a failure is detected.

The balance of system control subsystem 240 is shown in further detail in FIG. 7. The balance of system control subsystem 240 acts as the system 200 brain. Because of the extensibility and the intelligence built into the system 200 architecture, each subsystem may include very sophisticated controlling capability. Balance of system control subsystem 240 communicates with all the other subsystems, via the controller components 222, 216, 256, 226, and 232, and receives information from them via a control line 710 that is coupled to system controller 242. It also sends commands to all the different subsystems. Balance of system control subsystem 240 contains the programming for the entire system. This subsystem 240 holds the programming and provides a user interface via software interface 244 for control and status data.

The balance of system control subsystem 240 contains the system intelligence. It manages the device priority protocol which allows subsystems to prioritize the different applications for power management purposes. It contains the Intelligent Load Application Interface Technology, which allows the subsystem to provide variable power levels to applications based on DPP (on, off, or a state in between such as running at 50% power). Balance of system control subsystem 240 performs system monitoring on battery charge level, power generation, and power consumption level (all both historical and current).

Balance of system control subsystem 240 contains the user interface. This allows system configurability, allowing the user to perform setup and user customization, power management customization, device priority protocol, intelligent load application interface. The balance of system control subsystem 240 also provides a graphical output of the system status to user. In one embodiment, balance of system control subsystem 240 manages the communication between the subsystems and to the external user interface: GUI, keypad, touch screen LCD panel, wired USB connection or a wireless connection.

Balance of system control subsystem 240 manages fault control, the control of the maximum power threshold for the photovoltaic line 218 and the load line and controls the maximum battery discharge levels to protect the battery banks from damage.

In one embodiment, the subsystems may be implemented using multiple 8-bit digital/mixed signal microcontrollers with a built in real-time clock. Multiple control functions are possible. For example, for a lighting application, the following controls are possible:

The control mechanism allows for dusk to dawn control. A light sensor may be used to provide the control mechanism with light levels on which to base control. In further embodiments, the real time clock may include a calendar function and a sunrise/sunset table for use in determining appropriate times for dusk and dawn on which to control.

The light level can be modified based on detection of movement such as by use of motion sensing devices.

The light level can be reduced if battery charge is low based on one or more thresholds and various other controls, such as time of day. User controls may also be provided to allow overriding of the light level reduction.

The light can vary throughout the night, brighter before midnight, dimmer after midnight.

In one embodiment, photovoltaic line 217, acts as the power input bus for the system. The photovoltaic control subsystem 210 sends power via the photovoltaic line regulator 216 to the batteries through the photovoltaic line 217.

Load line 218 in one embodiment acts as the power output bus for the system 200. Battery power is transferred to the load line, via the load line regulator 226 in the storage control subsystem 220. When requested by the storage control subsystem 220, grid power is transferred to the load line from the grid power control subsystem 250 via the hybrid power regulator 256. Applications are fed power from the load line 218, via the load controller or controllers 232 in the application control subsystem 230.

All subsystems communicate with the balance of system control subsystem 240 through the control line. The balance of system control system 240 sends and receives information and commands via the control line. The balance of system control system 240 is programmed and sends out system status information via the control line.

Figure 8:
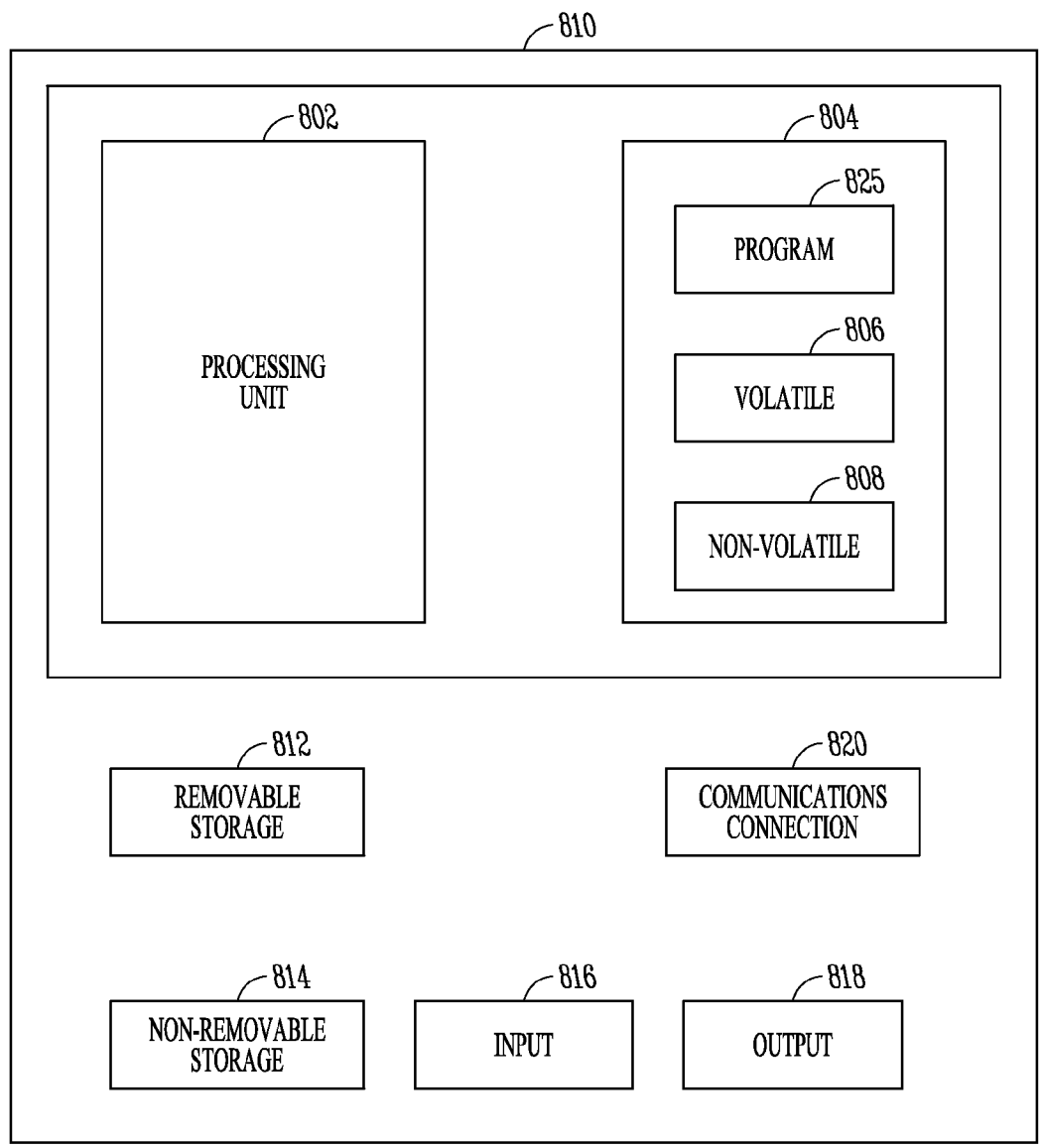
FIG. 8 is a block diagram of a computer system to implement one or more systems and methods according to an example embodiment.

A block diagram of a computer system or microcontroller that executes programming for one of more subsystems described above is shown in FIG. 8. A general computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a computer-readable medium.

Solar cells can eliminate the need for grid-tied electrical power. But prior to the introduction of this solar-electric hybrid solution, the amount of expensive solar material had to be overdesigned to handle all boundary conditions (for example, 15 straight days of heavy overcast weather) and ensure system reliability. Using the hybrid technology, the amount of solar material can be conservatively sized to provide enough electricity for average weather patterns. Edge cases may be handled by taking power from the grid. This results in a significant cost savings over a solar-only option by reducing the amount of solar material required.

One example control system load includes a parking lot light. The light needs to be lit from dusk until 1:00 am in one embodiment. The light may be fitted with solar material, in the form of polycrystalline silicon photovoltaic cells mounted to the top of the light.

The amount of surface area on the lantern top is approximately 0.13 square meters. For this particular location, the sun is expected to provide on average 6.77 peak sun hours per day. The average amount of energy coming from the sun, available to power the light on a daily basis is calculated as follows:

(amount of solar material)×(efficiency of solar material)×(amount of energy coming from the sun)×(losses due to less than optimal solar material positioning)=(amount of energy available to power the lantern)

For this example the average amount of energy coming from the sun is calculated as:

0.13 sq m of solar material×13% efficiency of solar panels×6,770 watt hours/sq meter×45%=51 watt-hours Today's most efficient lighting solutions use LEDs (light emitting diodes. Power to the LEDs can be modulated from a level of 3 Watts to 30 Watts. The different power levels result in corresponding changes in an illumination level.

If the LEDs were run at 8 watts, the power usage throughout the year is expected to be as shown in Table 1:

TABLE 1

Power Required to run a light during different times of year

| Month | Time of Sunset | Hours Until 1:00 am | Total Watts Required | Total Watts Expected from Sun |
|---|---|---|---|---|
| December | 4:59 PM | 8.00 | 64.00 | 51 |
| March | 7:17 PM | 5.72 | 45.76 | 51 |
| June | 8:25 PM | 4.58 | 36.64 | 51 |
| September | 7:17 PM | 5.72 | 45.76 | 51 |

If run at 8 watts, the light can run during most of the year on only solar power. However, during the winter months, with their reduced sunlight hours and increased need for illumination, the amount of solar material is not sufficient to run the light with only solar power.

In one embodiment, weather may be taken into account. The insolation number sited earlier (6.77 peak sun hours per day) is just an average. If the weather is abnormally overcast, power from the sun will be reduced and the light may also not perform as necessary.

To mitigate these factors, power to the light may be programmed to conserve energy during periods when the battery power is lacking. One possible option is to decrease the wattage (and the illumination level during the night.

Figure 9:
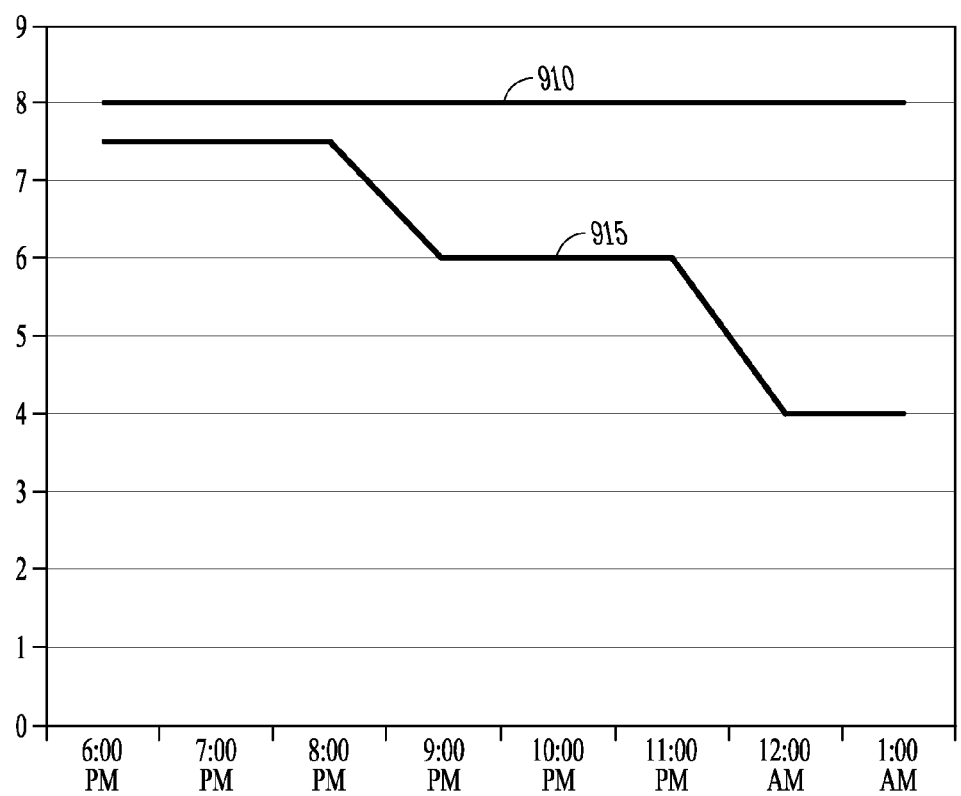
FIG. 9 is a graph illustrating a modified lighting profile showing watts provided as a function of time of day.

An example of a power-savings usage profile is shown in FIG. 9, which is a graph illustrating a modified lighting profile showing watts provided as a function of time of day. As shown in FIG. 9, a constant 8 watt level of illumination identified at 910 may be desired. However, if needed, a modified lighting profile identified at 915 may be used to reduce the power in a predetermined manner. In one embodiment, the power may be reduced in steps as the evening hours progress, so that by 1 AM, the power level is one-half of the normal level. Further profiles may be used and modified based on the needs of the load. While a lighting load is shown, there are many other types of loads that may be controlled in the same manner.

However, even if the lighting profile is modified to draw less power from the battery, perhaps in the winter months, a snow storm might darken the sky for several days. Such a storm would reduce the solar power generated and result in depletion of the battery.

To mitigate the effects of a snow storm or other factors, the light can be lit using a solar/electric hybrid system as described above. The system may function like the solar-only option, except with the inclusion of a backup grid-tied power connection, allowing for increased illumination levels for shaded locations, exceptionally overcast periods, or when it is desired that the light shine very brightly.

A grid backup allows for a smaller, less expensive battery, and reduces maintenance costs. However, it also requires a transformer, which increases the cost.

Operating costs may be increased slightly compared to the solar only option, since during exceptional times, electricity is being taken from the grid. Compared to a traditional grid-tied light, operating costs are significantly reduced because electricity is only needed during extraordinary circumstances.

In this example, using 24 1-Watt LEDs, the system would need a 12 Volt, 10 amp.hour battery, and 0.13 sq. meters of polycrystalline silicon photovoltaic cells.

The Abstract is provided to comply with 37 C.F.R. §1.72(b) to allow the reader to quickly ascertain the nature and gist of the technical disclosure. The Abstract is submitted with the understanding that it will not be used to limit the scope or meaning of the claims.

What is claimed is:

1. A method comprising:
receiving power from a solar array;
using the received power from the solar array to charge a battery;
applying power from the battery to power multiple loads;
monitoring power consumed by loads; and
supplying a reduced power to selected loads as a function of a predetermined priority for each load, power received from the solar array and available battery power.

2. The method of claim 1 and further comprising:
determining a power requirement to power a load in normal operating conditions; and
determining sizes for the solar array and the battery to provide sufficient power to the load during normal operating conditions.

3. The method of claim 2 wherein power is drawn from the grid during abnormal operating conditions.

4. The method of claim 3 wherein abnormal operating conditions are defined as within selected boundary operating conditions.

5. The method of claim 4 wherein the size of the solar array is no larger than that needed to supply sufficient power to the load within the selected boundary operating conditions.

6. The method of claim 1 and further comprising:
monitoring a battery drain rate;
determining expected power to be received from the solar array;
determining if the battery has sufficient power to power the loads prior to the solar array providing power to sufficiently power the loads at reduced power and recharge the battery; and
drawing power from the grid if sufficient power from the solar array is not expected.

7. The method of claim 1 wherein power is reduced as a function of time of day.

8. The method of claim 1 wherein the battery is charged in accordance with a charge profile for the battery dependent on battery size and chemistry.

9. A method comprising:
receiving power from a solar array;
using the received power from the solar array to charge a battery;
applying power from the battery to power multiple loads;
monitoring power consumed by loads;
supplying a reduced power to selected loads as a function of power received from the solar array and available battery power; and
turning off selected loads when insufficient power from the batter and solar array is available.

10. A method comprising:
receiving power from a solar array;
using the received power from the solar array to charge a battery;
applying power from the battery to power multiple loads;
monitoring a battery drain rate;
determining expected power to be received from the solar array;
determining if the battery has sufficient available power to power the loads prior to the solar array providing power to sufficiently power the loads and recharge the battery; and
supplying a reduced power to selected loads as a function of power received from the solar array and available battery power.

11. A method comprising:
determining total power requirements for multiple loads for operation during normal operating conditions;
determining sizes for a solar array and a battery to provide sufficient power to the loads during normal operating conditions;
selecting a controller to control providing power to the loads and charging battery such that power is drawn from a grid connection during operation outside normal operating conditions;
monitoring power from the load, wherein the load comprises multiple loads; and
supplying a reduced power to selected loads as a function of power received from the solar array and available battery power.

12. A system comprising:
a solar power subsystem that receives power from one or more solar power arrays;
a storage control subsystem coupled to the solar power subsystem to charge a battery from the power received by the solar power subsystem, the battery powering multiple loads;
a battery monitor to determine if the battery has sufficient power to power the multiple loads; and
an application control subsystem to monitor power needed by the loads, and to provide a reduced power to selected loads as a function of power received from the solar array and available battery power.

13. The system of claim 12 wherein the solar power arrays include photovoltaic arrays.

14. The system of claim 12 wherein the solar power arrays have a size limited to provide sufficient power under normal operating conditions.

15. The system of claim 12 and further comprising:
an application control subsystem to monitor power needed by the load, and to reduce power provided to selected loads as a function of power received form the solar array and available battery power.

16. The system of claim 15 wherein the application control subsystem turns off selected loads when insufficient power from the battery and solar array is available.

17. The system of claim 15 wherein power is reduced to selected loads as a function of a predetermined priority for each load.

18. The system of claim 15 wherein power is reduced as a function of time of day.

19. The system of claim 12 wherein the storage control subsystem comprises multiple batteries and wherein each battery is charged in accordance with a charge profile for the battery dependent on battery size and chemistry.

* * * * *